(12) United States Patent
Zhang et al.

(10) Patent No.: US 6,885,824 B1
(45) Date of Patent: Apr. 26, 2005

(54) EXPANDABLE OPTICAL ARRAY

(75) Inventors: Kevin J. Zhang, Santa Rosa, CA (US); Michael A. Scobey, Santa Rosa, CA (US); Robert W. Hallock, Santa Rosa, CA (US)

(73) Assignee: Optical Coating Laboratory, Inc., Santa Rosa, CA (US)

( * ) Notice: Subject to any disclaimer, the term of this patent is extended or adjusted under 35 U.S.C. 154(b) by 0 days.

(21) Appl. No.: 09/517,648

(22) Filed: Mar. 3, 2000

(51) Int. Cl.[7] .............................................. H04B 14/02
(52) U.S. Cl. ........................... 398/83; 398/85; 398/180
(58) Field of Search ............................... 398/81–83, 85, 398/180

(56) References Cited

U.S. PATENT DOCUMENTS

| | | | |
|---|---|---|---|
| 5,392,154 A | 2/1995 | Chang et al. ............... | 350/96.2 |
| 5,422,968 A | 6/1995 | Hanatani et al. ............... | 385/24 |
| 5,452,116 A | 9/1995 | Kirkby et al. ............... | 359/124 |
| 5,559,910 A | 9/1996 | Taga et al. .................... | 385/24 |
| 5,600,468 A | * 2/1997 | Barber ......................... | 398/42 |

(Continued)

FOREIGN PATENT DOCUMENTS

| | | | | |
|---|---|---|---|---|
| WO | WO 98/36294 | 8/1998 | | |
| WO | WO 99/07096 | 2/1999 | ............ | H04J/4/02 |
| WO | WO 99/12268 | 3/1999 | | |
| WO | WO 99/13607 | 3/1999 | ............ | H04J/14/02 |
| WO | WO 99/21039 | 4/1999 | ............ | G02B/6/293 |
| WO | WO 99/22259 | 5/1999 | ............ | G02B/6/28 |
| WO | WO 99/34538 | 7/1999 | ............ | H04B/10/00 |
| WO | WO 99/41858 | 8/1999 | ......... | H04B/10/135 |
| WO | WO 99/43118 | 8/1999 | ............ | H04J/14/02 |
| WO | WO 99/49601 | 9/1999 | ........... | H04B/10/17 |
| WO | WO 99/50938 | 10/1999 | ............. | H01S/3/00 |
| WO | WO 99/52232 | 10/1999 | ........... | H04B/10/24 |
| WO | WO 99/59281 | 11/1999 | ............ | H04J/14/02 |
| WO | WO 99/65174 | 12/1999 | ............ | H04J/14/02 |
| WO | WO 99/66660 | 12/1999 | ........... | H04B/10/18 |
| WO | WO 00/01098 | 1/2000 | ........... | H04B/10/18 |

OTHER PUBLICATIONS

Becker et al., Erbium–Doped Fiber Amplifiers, p. 66,273–74, 276, 294–95; 1999, San Diego.

*Primary Examiner*—Leslie Pascal
(74) *Attorney, Agent, or Firm*—Allen, Dyer, Doppelt Milbrath & Gilchrist, P.A.

(57) ABSTRACT

An optical component array allowing expansion of the occupied bandwidth on an existing optical transmission network without disrupting signal traffic. Wavelength selective filters (16, 30; 20, 34) and optical components, such as amplifiers (18, 32) are arrayed for use with a wavelength division multiplexed optical transmission system to transmit a selected portion of a transmission spectrum to an amplifier path and reflect the remainder of the spectrum. Wavelength selective filters and associated amplifiers are arranged in a cascade configuration with a bypass path (35, 37). Additional wavelength selective filters and amplifiers can be added in the bypass path without disrupting existing signal traffic, and such additions can provide for a remaining bypass path, thus allowing further expansion. This configuration provides an expandable amplifier array with a low initial cost. In a further embodiment, a center segment of the input transmission spectrum is passed through an amplifier path (60) and a red/blue splitter (62) having a transition region within the band of the center segment further splits the input spectrum into two expandable amplifier arrays paths. The two arrays allow reduced insertion loss and optimization of amplifier characteristics for multi-channel systems.

11 Claims, 5 Drawing Sheets

U.S. PATENT DOCUMENTS

| | | | |
|---|---|---|---|
| 5,608,571 A | 3/1997 | Epworth et al. | 359/341 |
| 5,675,432 A | 10/1997 | Kosaka | 359/341 |
| 5,801,858 A | 9/1998 | Roberts et al. | 359/114 |
| 5,831,754 A | 11/1998 | Nakano | 359/161 |
| 5,838,847 A | 11/1998 | Pan et al. | 385/18 |
| 5,914,795 A | 6/1999 | Jourdan et al. | 359/134 |
| 5,930,016 A | 7/1999 | Brorson et al. | 359/127 |
| 5,943,454 A | 8/1999 | Aksyuk et al. | 385/22 |
| 5,953,141 A | 9/1999 | Liu et al. | 359/124 |
| 5,974,207 A | 10/1999 | Aksyuk et al. | 385/24 |
| 6,229,935 B1 * | 5/2001 | Jones et al. | 385/24 |
| 6,256,433 B1 * | 7/2001 | Luo et al. | 385/24 |
| 6,348,984 B1 * | 2/2002 | Mizrahi | 398/79 |
| 6,359,725 B1 * | 3/2002 | Islam | 359/334 |
| 6,381,049 B1 * | 4/2002 | Xu et al. | 398/82 |

* cited by examiner

EXPANDABLE OPTICAL ARRAY

CROSS-REFERENCE TO RELATED APPLICATIONS

Not applicable.

STATEMENT REGARDING FEDERALLY SPONSORED RESEARCH OR DEVELOPMENT

Not applicable.

REFERENCE TO MICROFICHE APPENDIX

Not applicable.

FIELD OF THE INVENTION

The present invention is generally related to optical networks, and in a, particular provides methods and apparatus for manipulating wavelength division multiplexed optical signals.

BACKGROUND OF THE INVENTION

Optical fiber networks are used in a variety of applications, such as optical telecommunication and data transmission systems. Optical fiber networks use optical fibers as transmission lines for carrying light signals. The light signals propagate down the fiber from one location to another, analogous to electrical signals traveling down a wire or cable from one location to another. Optical fibers are used in a variety of applications, such as metro access local loops and "long haul" transmission lines. Long haul transmission lines might carry signals between cities or across oceans, for example.

Optical fibers can carry a single channel, or many channels can be multiplexed onto a single fiber. Multiplexing is way of increasing the information-carrying capacity through an optical fiber. There are various ways to multiplex signals on an optical fiber or other type of transmission line, including time division multiplexing and wavelength division multiplexing ("WDM"). In a WDM system, a number of wavelength channels are carried on a single optical fiber. A channel is typically defined as a frequency (wavelength) of light that is modulated to carry information. Optical WDM networks typically allocate a portion of the spectrum about a center frequency of the nominal channel wavelength for signal transmission. For example, channels might be spaced 100 Glz apart with ±12.5 GHz on either side of the channel center frequency in a particular system, thus providing the channel with a "width" of 25 GHz. Channel spacing of 100 GHz or less is commonly referred to as dense wavelength division multiplexing ("DWDM") Other systems may require or allow a narrower or wider channel widths or spacings.

It is typically very expensive to install a WDM network, and therefore it is desirable to use the installed system as efficiently as possible. DWDM is a technology enabling increased capacity of fiber networks without needing to install additional fiber cables. However, it is not a simple matter to merely add more channels onto an existing fiber network. For example, a light pulse in a digital transmission system is typically "spread" or dispersed as it travels along an optical fiber and through components of the optical communication network, and dispersion may affect the new channels beyond acceptable limits. Similarly, a light signal loses strength as it propagates down an optical afiber, and repeater stations are typically required at regular intervals (e.g. every 100 km) to boost (amplify) the signal. Adding channels may affect the gain available per-channel at each repeater station, and thus require more powerful amplifiers or additional amplifier states.

One conventional method routes the entire spectrum (bandwidth) carried by the fiber into a broad-band amplifier and amplifies all signals. Unfortunately, such amplifiers generally do not amplify all channels equally. If amplifiers with similar characteristics are used in a chain of repeaters, the amplitude difference between channels accumulates. Some sort of amplitude equalization is typically required. A further problem is that the amplifier is generally optimized for a certain input power and bandwidth ("gain bandwidth"). Thus, adding additional channels essentially dilutes the power available for each channel or may fall outside of the gain bandwidth, and if the added channels are outside of the original design bandwidth, the amplifier might not supply sufficient gain for these new channels. Adding additional amplifiers to accommodate additional channels might require "breaking" the transmission line, disrupting all communication traffic while the new amplifier is installed.

Another method routes the optical signal to a multiplexer and de-multiplexes the signal into channels or multi-channel segments of the transmission spectrum. Each segment of the spectrum is amplified and routed to a multiplexer to combine all the segments back onto the transmission line, thus allowing amplifiers to be optimized for a particular of the transmission spectrum. However, multiplexers typically have a fixed "fan-out", thus any expansion of the network must be anticipated at the time the demultiplexer/multiplexer is installed. Unfortunately, it is not always possible to anticipate how a network might be expanded, or how many channels might be added. Therefore, installation of a multiplexer with insufficient or inappropriate fan-out might present the network operator with the dilemma of not utilizing the installed optical transmission lines at their full capacity, or disrupting all signal traffic to install a new multiplexer system.

Furthermore, installing a multiplexer capable of handling the total number of anticipated channels requires an initial expense for capacity that is not used for some time. For example, an optical transmission line might have an anticipated capacity of 40 channels, whereas only 8 channels will initially be occupied with optical data transmission. A 1×40 de-multiplexer and multiplexer would typically be installed, even though only 8 channels will initially be used. If the channel capacity of the optical transmission line changed to 80 channels, the network operator would be faced with the choice discussed in the preceding paragraph. If the channel capacity or definition were changed again, the same dilemma would be presented. The dynamic growth of optical networks and capabilities of the transmission lines and their components makes accurately predicting how an optical network will expand difficult, at best.

Thus, expanding an optical fiber network to accommodate additional channels presents many challenges. It would be desirable to provide a system that allowed upgrades without disrupting all traffic on an optical transmission line, and without needing to predict the manner in which the network might develop. It would be further desirable that upgrade capability include the ability to add additional channels in the transmission spectrum. It would also be desirable that such a system provide capability for signal improvement, such as dispersion compensation or level control, and avoid excessive insertion loss.

SUMMARY OF THE INVENTION

The present invention provides an optical component array for use in wavelength division multiplexed ("WDM")

systems. The array is capable of being upgraded in a variety of fashions with no or minimal disruption of the optical signal transmission. In one embodiment, a modular optical amplifier is integrated with a wavelength-selective flter(s) to produce an ADDIDROP node. ADDIDROP nodes are cascaded, each node including an amplifier. In a further embodiment, the performance of an amplifier in a specific node is optimized according to the desired characteristics of the signal passed through the node.

In another embodiment, the transmission spectrum is divided into three portions including a low-frequency ("red") portion, a high-frequency ("blue") portion, and a splitter portion. The splitter portion is routed to a first amplifier that passes the splitter portion to the output. The splitter portion is amplified, and other operations, such as dispersion compensation and/or signal leveling, may be provided within or outside of the amplifier module. The red and blue portions are separated using a signal splitter, such as a low-pass (or high-pass) filter. The splitter has a transition characteristic less than or equal to the splitter portion of the transmission spectrum routed through the first amplifier. The red portion is then routed to a first amplifier array, and the second portion is routed to a second amplifier array. In a preferred embodiment, the first and second amplifier arrays are cascaded arrays. After amplification and any other signal processing, the three portions are combined to form the output signal. In a further embodiment, the entire input signal is amplified in a preamplifier prior to division into the three portions.

In yet another embodiment, the transmission spectrum is divided into at least two portions including an odd channel portion and an even channel portion with an interleaf splitter. The interleaf splitter routes a first set of alternating channels (i.e. the "odd" channels) to a first expandable cascade path and a second set of alternating channels (i.e. the "even" channels) to a second expandable cascade path.

DETAILED DESCRIPTION OF THE INVENTION

The present invention provides an optical component array capable of being upgraded to increase the number of channels carried on an optical transmission line. The array may generally be expanded or improved with little or no disruption of existing optical signal traffic. The array allows installation of only those components needed to carry an existing traffic load, for example 8 dense wavelength division multiplexed ("DWDM") channels, while allowing expansion of the number of channels, for example to 160 DWDM channels. The array avoids the up-front cost and reliability issues of providing multiplexers, amplifiers, and associated components capable of handling the entire planned channel expansion at the time of system installation, compared to a conventional amplifier array. In one embodiment, the array allows manipulation of the optical signal in one path of an amplifier array, such as for dispersion compensation, amplitude leveling, or channel ADD/DROP, while passing the optical signal in other paths without such manipulation.

Figure 1A:
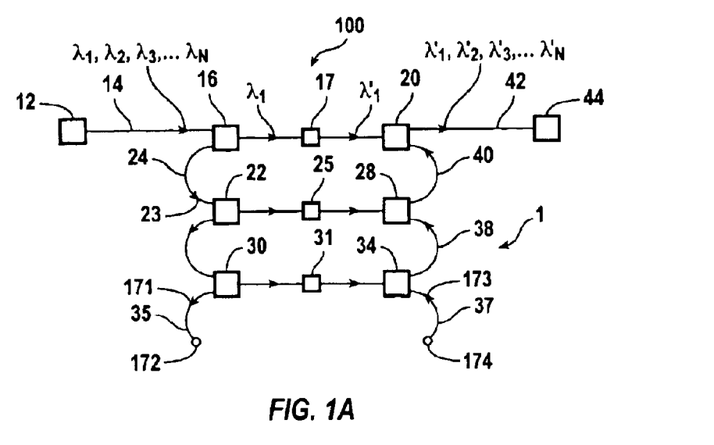
FIG. 1A is a simplified diagram of an optical component array according to an embodiment of the present invention.

FIG. 1A is a simplified schematic of an optical component array 10 according to a particular embodiment of the present invention. An optical component (e.g. 17, 25, 31) s, for example an amplifier, multiplexer, demultiplexer, filter, dispersion compensation odule, cross connection, ADD/DROP module, amplitude adjustment module, thru line, or imilar structure or device that couples to an optical signal, with or without modification, from one port of the component to another. An input signal $\lambda 1, \lambda 2, \lambda 3, \ldots, \lambda N$ originating from a source (transmission) portion 12 of an optical transmission network 100 is carried on an optical input transmission line 14. The optical input transmission line is, for example, an optical fiber, but may be or include portions of other types of transmission lines. The input signal typically includes a number of "channels", each channel having an assigned nominal frequency (wavelength). Depending on system requirements, each channel typically also has an allowed "width", which is usually expressed in terms of a frequency about the center frequency or a frequency band. For example, in one DWDM system, channels are spaced 100 GHz apart and each channel is allowed a width of 30 GHz to accommodate freuency drift, pulse widening, and so forth, while allowing enough separation between channels to avoid inter-channel interference. The data carried on each channel is typically in digital form, i.e. a series of pulses, but a channel might have analog information.

The input signal is optically coupled to a wavelength selective input filter 16 that passes a first portion $\lambda 1$ of the input signal to an optical component 17, which couples the first portion of the signal to a wavelength selective output filter 20. The optical component could be an amplifier, for example, as described below in reference to FIGS. 1A and 1B, or could be another type of optical device, such as a dispersion compensation module or amplitude correction module. The first portion of the input signal could be modified, such as by leveling or dispersion compensation, or even replaced, such as in an ADD/DROP process, thus the output $\lambda 1'$ of the optical component 17 could be essentially identical to or quite different from (within the same segment of the spectrum) the input to the component, but is generally modified. The input filter and output filter could be a channel selective (i.e. bandpass) filter, for example, or could be a low-pass or high-pass filter. For purposes of discussion, "low-pass" and "high-pass" will refer to low and high frequencies, which correspond to longer and shorter wavelengths, respectively. Generally, the signal filters transmit a selected portion of the input signal and reflect other frequencies.

A channel selective filter generally would transmit or otherwise couple a "segment" of the transmission spectrum containing a single channel or several adjacent channels to one optical path, and reflect or otherwise couple the remainder 23 of the input signal, if any, to another optical path. A low-pass filter would transmit lower frequencies, which may include one or more channels, below a selected cut-off frequency, and reflect the higher frequencies. In a preferred embodiment, the filters are stacks of dielectric thin films. Alternatively, other filters could be used, such as fiber Bragg grating filters. Such filters might reflect, rather than transmit, the first selected portion of the band, and utilize optical isolators or directional couplers to manage signal flow, rather than the transmission/reflection characteristics of the preferred dielectric thin-film filters.

The wavelengths reflected from the first input filter are optically coupled to all another wavelength selective input filter 22 via a first input cascade transmission line 24, which could be a length of optical fiber, for example. This wavelength selective input filter could be another channel selective filter or a low- or high-pass filter. For example, in the case where the first input filter is a low-pass filter, the second input filter could be another low-pass filter with a higher cut-off frequency, or a band pass filter. Those skilled in the art will appreciate that the various input filters do not need to be of the same type. This wavelength selective input filter 22 passes a second selected portion of the input signal to another optical component 25. This optical component couples the second selected portion of the input signal to a second wavelength selective output filter 28.

The frequencies reflected from the second input signal are optically coupled to another wavelength selective input filter 30 that passes a third portion of the input signal to another optical component 32 and then to a wavelength selective output filter 34. The remainder of the frequencies, if any 171, that are reflected from the third input filter are optically coupled to a bypass output line 35. A bypass transmission line (see reference numeral 36 in FIG. 1C) can be used to optically couple the bypass output port 172 with the bypass input port 174. Additional optical signals 173 could be provided at the bypass input port, generally not falling within the pass band of any of the wavelength selective output filters in the array.

If no signal traffic is being carried on the part of the transmission spectrum coupled to the bypass, the bypass output and input ports can be left open, allowing for future expansion of the amplifier array. In one embodiment, the bypass transmission line carries signals of sufficient strength or quality (e.g. signal-to-noise ratio or narrow pulse width) so that those signals do not need to be modified with an optical component other than a thru line. The bypass transmission line could be a section of optical fiber, for example. In an alternative embodiment, an optical amplifier (not shown) could be provided in the bypass path to amplify any optical signals carried on this path. Those skilled in the art will appreciate that there need not be any signal present in any of the paths, particularly that there might not be any signal present in the bypass path, which would allow this path to be broken without disrupting current signal traffic for the addition of additional paths.

In a preferred embodiment, the entire input signal is routed through one of the optical component paths and the bypass transmission line is left open, as a "pigtail", namely a bypass output line 35 and a bypass input line 37. Those skilled in the art recognize that three optical component paths are shown for purposes of illustration only, and that a component array according to the present invention can have greater or fewer paths. For purposes of discussion, the optical component configuration shown in FIG. 1A will be referred to as a cascade or "ladder" configuration, and each optical component path will be referred to as a "rung", the rungs providing parallel paths.

Signals present at the bypass input port 174, if any, are reflected off the wavelength selective output filter 34 and combined with the third portion of the input signal on the second output cascade transmission line 38. The signals carried on the second output cascade transmission line 38 are reflected off the wavelength selective output filter 28 and combined with the amplified second portion of the input signal on the first output cascade transmission line 40. The signals carried on the first output cascade transmission line 40 are reflected off the wavelength selective output filter 20 and combined with the first portion of the input signal on the output transmission line 42. It is understood that the output signals $\lambda1'$, $\lambda2$, $\lambda3'$, . . . , $\lambda N'$ are generally modified from their counterpart input signals, such as by amplification, noise reduction, level adjustment, and/or dispersion compensation. Thus, the entire input signal spectrum can be passed to the output transmission line 42 and sent to a destination (receiver) 44.

In a particular application, all signals carried on the input transmission line are passed through one of the optical components in one of the rungs of the array, and the shunt transmission line is left open as a pair of ports. This allows the array to be upgraded by adding additional rungs to accommodate additional channels that are not occupied on the initial input signal. For example, an optical network might be initially installed that only has enough traffic to justify three channels, although the optic fiber transmission lines might be capable of handling forty channels. The array of the present invention allows initial installation of only those components and a ssociated circuits necessary to handle the planned initial three channels of signal traffic, while allowing expansion and growth as needed, without disrupting the pre-existing signal traffic. The unoccupied channels may be at the high or low end of the potential input signal spectrum, or may be interspersed with occupied channels.

In some instances, some rungs may have the capacity to handle additional channels. For example, the wavelength selective input filter may pass a segment of the transmission spectrum containing a number of contiguous channels, only one of which is occupied. The component in that rung may be designed to handle all of the channels passed by the input filter, if and when the additional channels become occupied, or might be upgraded at a later date to handle the additional signal traffic. Alternatively, the component in that rung could be removed and replaced with a sub-ladder, assuming the wavelength selective filters on that rung can remain in place while removing the optical component, without disrupting signal traffic on the other rungs.

Figure 1B:
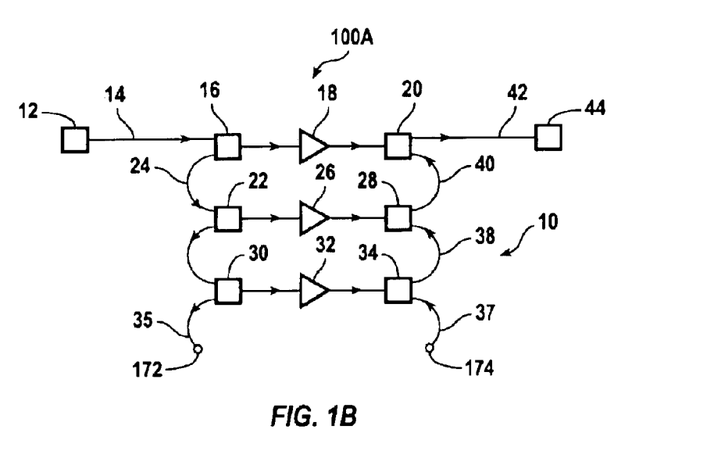
FIG. 1B is a simplified diagram of an amplifier array according to an embodiment of the present invention.

FIG. 1B is a simplified schematic of an optical amplifier array 10 according to a particular embodiment of the present invention. An input signal originating from a source (transmission) portion 12 of an optical transmission network 100 is carried on an optical input transmission line 14. The optical input transmission line is, for example, an optical fiber, but may be or include portions of other types of transmission lines. The input signal typically includes a number of "channels", each channel having an assigned nominal frequency (wavelength). Depending on system requirements, each channel typically also has an allowed "width", which is usually expressed in terms of a frequency about the center frequency or a frequency band. For example, in one DWDM system, channels are spaced 100 GHz apart. Each channel is allowed a width of 50 GHz to accommodate frequency drift, pulse widening, and so forth, while allowing enough separation between channels to avoid inter-channel interference. The data carried on each channel is typically in digital form, i.e. a series of pulses, but a channel might have analog information.

The input signal is optically coupled to a wavelength selective input filter 16 that passes a first portion of the input signal to an optical amplifier 18, which amplifies the first portion of the signal and passes it to a wavelength selective output filter 20. In a preferred embodiment, the amplifier is an erbium-doped fiber amplifier, but could be a semiconductor optical amplifier, fiber amplifier with other or additional dopants, or other type of optical amplifier. The input filter and output filter could be a channel selective (i.e. bandpass) filter, for example, or could be a low-pass or high-pass filter. For purposes of discussion, "low-pass" and "high-pass" will refer to low and high frequencies, which correspond to longer and shorter wavelengths, respectively. Generally, the signal filters transmit a selected portion of the input signal and reflect other frequencies. A channel selective filter generally would transmit or otherwise couple a contiguous portion of the transmission spectrum containing a single channel or several adjacent channels (i.e. a "segment" of the transmission spectrum) to one optical path, and reflect or otherwise couple the remainder of the transmission spectrum to another optical path. A low-pass filter would transmit lower frequencies, which may include one or more channels, below a selected cut-off frequency, and reflect the higher frequencies. In a preferred embodiment, the filters are stacks of dielectric thin films. Alternatively, other filters could be used, such as fiber Bragg grating filters. Such filters might reflect, rather than transmit, the first selected portion of the band, and utilize optical isolators or directional couplers to manage signal flow, rather than the transmission/reflection characteristics the preferred dielectric thin-film filters.

The frequencies reflected from the first input filter are optically coupled to another wavelength selective input filter 22 via a first input cascade transmission line 24, which could be a length of optical fiber, for example. This wavelength selective input filter could be another channel selective filter or a low- or high-pass filter. For example, in the case where the first input filter is a low-pass filter, the second input filter could be another low-pass filter with a higher cut-off frequency, or a band pass filter. Those skilled in the art 63 will appreciate that the various input filters do not need to be of the same type. This wavelength selective input filter 22 passes a second selected portion of the input signal to another optical amplifier 26. This optical amplifier amplifies the second portion and couples it to a wavelength selective output filter 28.

The frequencies reflected from the second input signal are optically coupled to another wavelength selective input filter 30 that passes a third portion of the input signal to another optical amplifier 32 and then to a wavelength selective output filter 34. The remainder of the frequencies, if any, that are reflected from the third input filter are optically coupled to a bypass output line 35. A bypass transmission line (see reference numeral 36 in FIG. 1C) can be used to optically couple the bypass output port 172 with the bypass input port 174.

If no signal traffic is being carried on the part of the transmission spectrum coupled to the bypass, the bypass output and input ports can be left open, allowing for future expansion of the amplifier array. In one embodiment, the bypass transmission line carries signals of sufficient strength or quality (e.g. signal-to-noise ratio or narrow pulse width) so that those signals do not need to be amplified. The bypass transmission line could be a section of optical fiber, for example. In an alternative embodiment, an optical amplifier (not shown) could be provided in the bypass path to amplify any optical signals carried on this path. Those skilled in the art will appreciate that there need not be any signal present in any of the paths, particularly that there might not be any signal present in the bypass path, which would allow this path to be broken without disrupting current signal traffic for the addition of additional amplifier paths.

In a preferred embodiment, the entire input signal is routed through one of the three amplifier paths and the bypass transmission line is left open, as a "pigtail", namely a bypass output line 35 and a bypass input line 37. Those skilled in the art recognize that three amplifier paths are shown for purposes of illustration only, and that an amplifier array according to the present invention can have greater or fewer amplifier paths. For purposes of discussion, the amplifier configuration shown in FIG. 1B will be referred to as a cascade or "ladder" configuration, and each amplifier path will be referred to as a "rung", the rungs providing parallel amplifier paths.

Signals present at the bypass output port 37, if any, are reflected off the wavelength selective output filter 34 and combined with the amplified third portion of the input signal on the second output cascade transmission line 38. The signals carried on the second output cascade transmission line 38 are reflected off the wavelength selective output filter 28 and combined with the amplified second portion of the input signal on the first output cascade transmrission line 40. The signals carried on the first output cascade transmission line 40 are reflected off the wavelength selective output filter 20 and combined with the amplified first portion of the input signal on the output transmission line 42. Thus, the entire input signal is passed to the output and sent to a destination (receiver) 44.

In a particular application, all signals carried on the input transmission line are amplified by one of the amplifiers in a rung of the array, and the shunt transmission line is left open as a pair of ports. This allows the amplifier array to be upgraded by adding additional rungs to accommodate additional channels that are not occupied on the initial input signal. For example, an optical network might be initially installed that only has enough traffic to justify three channels, although the optic fiber transmission lines might be capable of handling forty channels. The amplifier array of the present invention allows initial installation of only those amplifiers and associated circuits necessary to handle the planned initial three channels of signal traffic, while allowing expansion and growth as needed, without disrupting the pre-existing signal traffic. The unoccupied channels may be at the high or low end of the potential input signal spectrum, or may be interspersed with occupied channels. In some instances, some rungs may have the capacity to handle additional channels. For example, the wavelength selective input filter may pass a segment of the transmission spectrum containing a number of contiguous channels, only one of which is occupied. The amplifier in that rung may be designed to handle all of the channels passed by the input filter, if and when the additional channels become occupied, or might be upgraded at a later date to handle the additional signal traffic. Alternatively, the amplifier in that rung could be removed and replaced with a sub-ladder, assuming the wavelength selective filters on that rung can remain in place while removing the amplifier, without disrupting signal traffic on the other rungs.

Figure 1C:
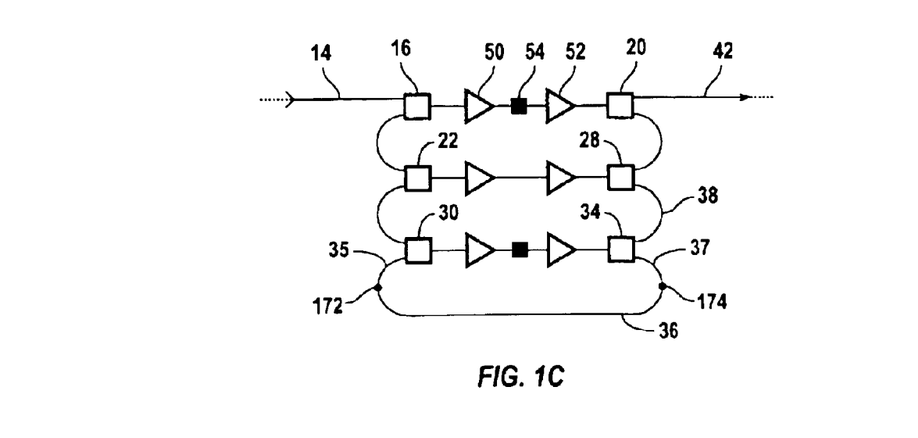
FIG. 1C is a simplified diagram of an amplifier array showing additional details of an array that is consistent with FIG. 1B.

FIG. 1C is a simplified schematic of the amplifier array shown in FIG. 1B with additional details according to a particular embodiment of the present invention. The first rung of the amplifier array includes a first amplifier 50 and a second amplifier 52. A signal processing function is performed by a signal processing module 54 between the amplifiers, and might not be required for all rungs. The first amplifier can be optimized for low-noise pre-amplification and the second amplifier can be optimized for power or gain characteristics, for example. The signal processing module could provide dispersion a compensation, signal level equalization such as gain flattening and gain equilization, channel ADD/DROP, further signal filtering, or other types of functions. Although each rung of the amplifier array is shown as including two-stage amplification, it is understood that some rungs may need only a single-stage amplifier. In this amplifier array, a bypass transmission line 36 optically couples the bypass output port 172 to the bypass input port 174.

While some paths of the amplifier array include a signal processing module 54, other paths might not need such a feature. In particular, not all segments of the spectrum might need signal processing at each repeater location in a transmission network. Additionally, as channels are added to the amplifier array, the new channels may or may not need the type of signal processing provided for existing channels, or might need different types of processing. For example, the first channels occupied on a network might occupy those portions of the transmission spectrum where the optical fiber transmission characteristics, amplifier characteristics, or characteristics of other components make those channels particularly desirable or easy to implement. Subsequent channels may operate closer to the boundaries of acceptable performance, and require additional signal processing, such as more frequent gain correction or dispersion compensation.

Figure 2A:
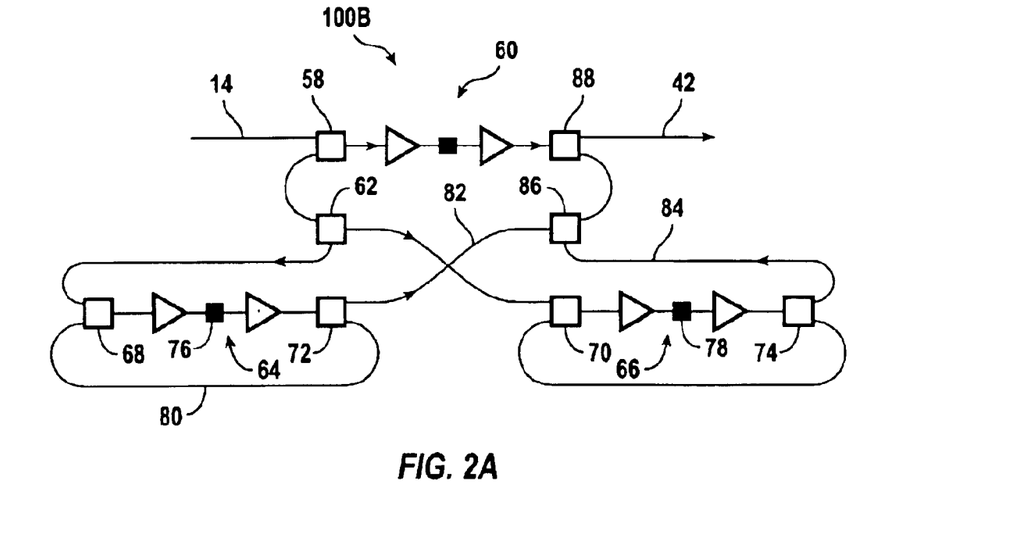
FIG. 2A is a simplified diagram of an amplifier array according to an embodiment of the present invention illustrating a split spectrum array that is capable of amplifying the entire input signal spectrum.

FIG. 2A is a simplified schematic of one embodiment of a "split" amplifier array 100B according to another embodiment of the present invention. This configuration is referred to as a split because the input spectrum is split into three portions, two of the portions being routed to associated ladder amplifier sub-arrays. A first input filter 58 passes a selected segment of the input signal (i.e. a channel or set of adjacent channels) carried on an input transmission line 14 to a first amplifier 60. For purposes of discussion only, this segment will be referred to as a "center" segment. It is expressly understood that the segment need not be centered within the transmission spectrum, but that it falls within the longer and shorter wavelength limits of the transmission spectrum. The remainder of the input signal is reflected to an input splitter 62. The input splitter divides the input signal into a lower-frequency/longer wavelength ("red") portion and a higher-frequency/shorter wavelength ("blue") portion. The red portion is routed to a second amplifier 64, and the blue portion is routed to a third amplifier 66. Each of these amplifier paths includes input filters 68, 70, amplifiers 64, 66, and output filters 72, 74, as discussed above in reference to FIGS. 1A and 1B. Additional, optional details are shown, such as two-stage amplification with intermediate signal processing modules 76, 78. The selected segment of the input signal passed to the first amplifier has a bandwidth essentially greater than or equal to a transition bandwidth of the input splitter.

After the respective red and blue portions of the input signal are amplified, they are combined in a red/blue output combiner 86, which can be a similar, or even identical, structure to the input splitter 62, and then combined with the selected portion of the input signal at a first output filter 88. Thus, the entire input signal is passed to the output transmission line 42. It is understood that although the amplifier-array shown in FIG. 2A has been described with all optical signal traffic "flowing" in the same direction (i.e. from left to right as viewed with respect to the amplifier symbols), that traffic in one of the red or blue portions of the transmission spectrum could flow in a direction opposite to the other. As with the case described above, the portion of the transmission spectrum flowing through the first amplifier 60 allows use of the transmission spectrum for signal transmission, without "losing" a portion of the spectrum for the splitter/combiner transition region. Similarly, one or more of the paths (red, center, or blue) might not require amplification. It is understood that optical components other than amplifiers, such as are described above in conjunction with FIG. 1A, could be used in the configuration illustrated in FIG. 2A.

Figure 2B:
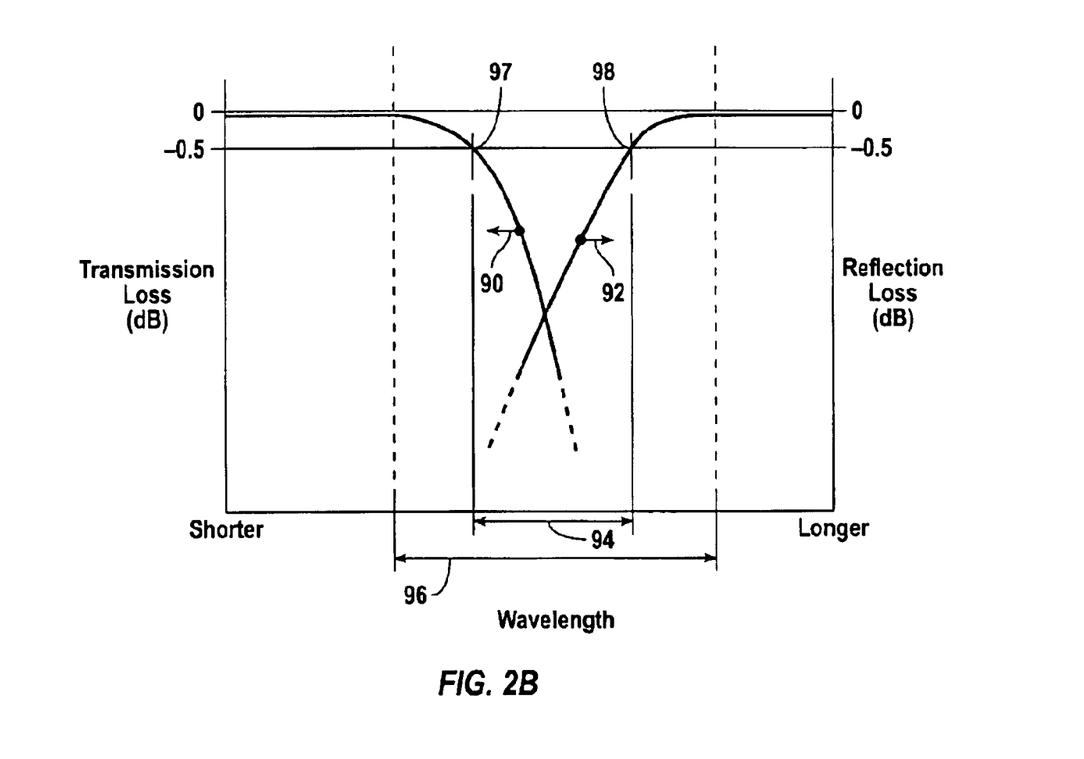
FIG. 2B is a simplified illustration of idealized transmission and reflection characteristics of a red/blue splitter (combiner)

FIG. 2B is a simplified representation of an idealized frequency characteristic of a red/blue splitter. The shorter wavelengths are transmitted 90 to the first amplifier array, for example, while the longer wavelengths are reflected 92 to the second amplifier array. It is understood that the longer wavelengths could be transmitted, etc. The splitter characteristic includes a transition region, or band 94 between the lower and higher wavelengths. It is generally desirable that no signals are present in the portion of the spectrum where the splitter is transitioning from low to high frequency characteristics because of the slope of the frequency characteristics in this region. It is further generally desirable to allow for variations in the splitter frequency characteristics arising from process variations in splitter fabrication, thermal drift, and so forth.

Accordingly, the center segment 96 of the spectrum of the input signal selected to pass through the first input filter 58 and amplifier 60, before the red/blue splitter 62, is preferably greater than the width of the transition region 94. Those skilled in the art will appreciate that the "center segment" does not need to be centered according to the input band or channel allocation, but that it is generally chosen to allow selection of an appropriate splitter/combiner.

One way to characterize the width of the splitter transition region is to define the frequencies at which the amplitude of the transmitted or reflected signal is 0.5 dB lower than zero insertion loss or reflection loss, respectively. The frequency band between these "0.5 dB" points 97, 98 is the transition region. Other definitions, e.g. −1 dB or −3 dB points, could be used. In this system the splitter is essentially centered about the input signal spectrum; however, the splitter could be offset to accommodate actual or planned signal traffic that is not symmetrical about the center of the input signal band, or for other reasons.

It is generally desirable that, after the red/blue split, each amplifier sub-array has an equal or near-equal number of amplifier paths. This arrangement results in similar insertion loss for each sub-array, as will be discussed in further detail below with reference to FIGS. 3A and 3B. In some instances, one split portion of the red/blue split spectrum may have more stringent requirements than the other, and the transition band may be selected accordingly, e.g. to optimize insertion loss or gain characteristics in one portion of the split spectrum with respect to the other portion. However, the selected portion of the input signal passed through the first amplifier before the band is split is selected according to the splitter transition band.

Figure 3A:
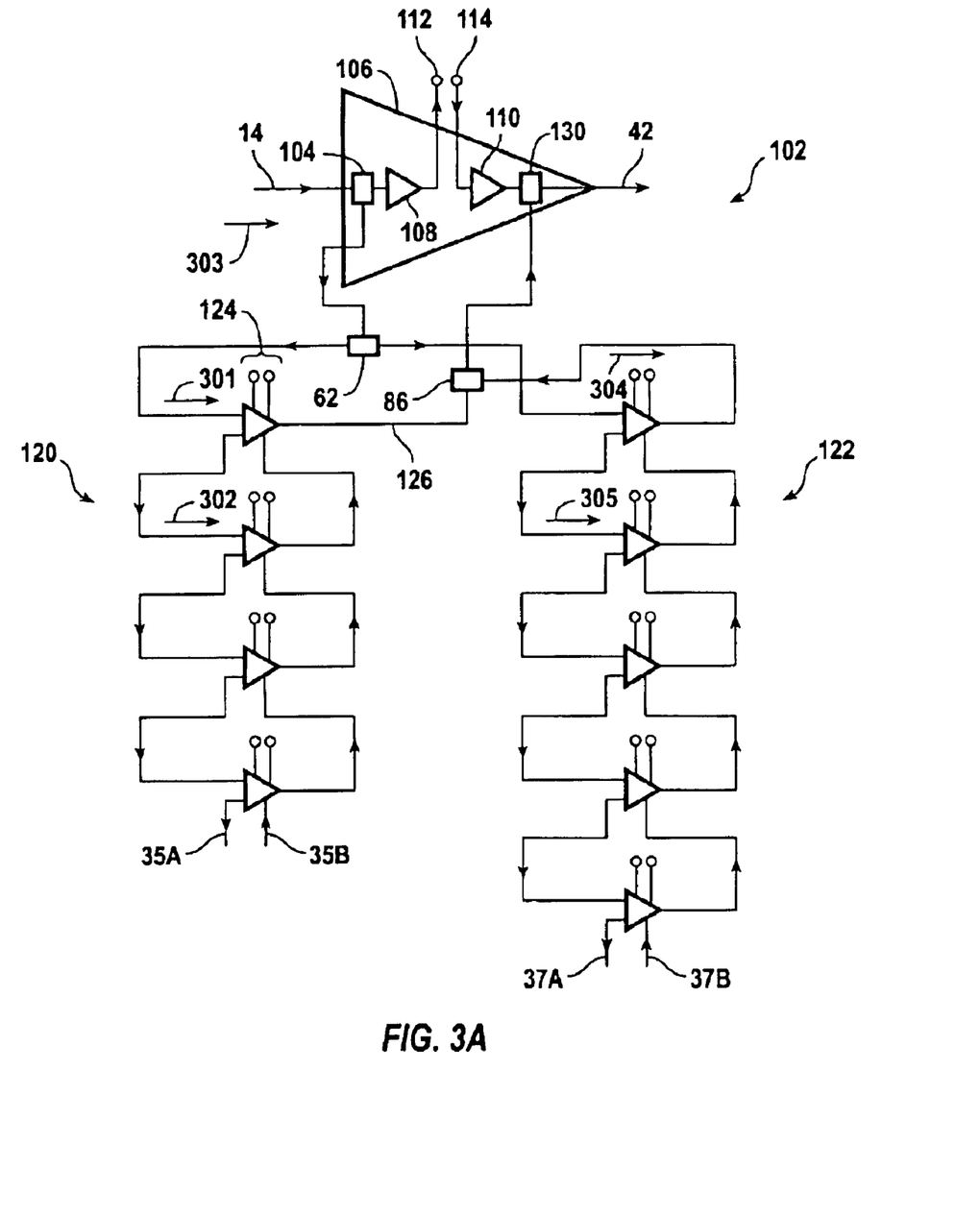
FIG. 3A is a simplified diagram of a split ladder, or split cascade, amplifier array according to another embodiment of the present invention.

FIG. 3A is a simplified schematic of an amplifier array 102 according to a further embodiment of the present invention. The input signal carried on the input transmission line 14 is filtered by a wavelength selective filter 104. This filter is commonly referred to as an ADD/DROP ("A/D") filter or WDM filter. In a preferred embodiment it is a stack of alternating dielectric layers that transmits a selected segment of the input spectrum (i.e. a channel or set of contiguous channels) and efficiently reflects the remaining portion of the input spectrum, which may contain active channels (i.e. carrying data) as well as additional spectrum for adding additional channels in the future. In a particular embodiment, the A/D filter transmits four adjacent channels, each separated by 100 GHz, with an additional 15 GHz on either side for associated channel width. This allows the red/blue splitter 62 to have a transition band anywhere within a 330 GHz wide window. This window allows for variations in the splitter characteristics, as discussed above in reference to FIG. 2B. It is understood that the frequency band selected by the filter 104 depends on the anticipated spectral characteristics of the splitter 62 (and/or combiner 86).

The first amplifier stage 106 includes a first amplifier 108 and a second amplifier 10. The first amplifier 108 provides an output available at a center tap output 112. A center tap input 114 provides the input to the second amplifier 110. The selected portion of the input signal transmitted by the filter 104 is thus pre-amplified in the amplifier 108, and made available for signal processing, such as with a dispersion compensation uJ 20 module (not shown), at the center tap output 112 before being returned to the second amplifier 110 via the center tap input 114. If no signal processing is required, then the center tap output can be connected to the center tap input with a shunt transmission line (not shown).

The portion of the input signal not transmitted by the first filter 104 is reflected to a red/blue splitter 62. The splitter further divides the remaining portion of the input signal into a high-frequency portion and a low-frequency portion. The high-frequency portion is routed to a first amplifier sub-array 120, and the low frequency portion is routed to a second amplifier sub-array 122. Each amplifier in each sub-array is similar in that each is a two-stage amplifier with a center tap 124, as shown for the first amplifier, allowing a signal processing module (not shown) to be interposed between the amplifier stages. Each amplifier leg has an associated input filter transmitting a selected segment of the remaining input signal (i.e. channel or adjacent channels) to the amplifier section, and an associated output filter transmitting the amplified segment to be combined on the amplifier sub-array output transmission line 126. Each sub-array 120, 122 includes a bypass output port 35A, 37A and a bypass input port 35B, 37B; however, in other embodiments only one sub-array might have bypass ports.

In an alternative embodiment, some or all of the amplifiers could be single-stage amplifiers. For example, if a particular segment of the input spectrum does not require signal processing because of the nature of the signal, transmission system, amplifier characteristics, or other aspects and combinations of the optical network, then a single-stage amplifier might be suitable. Generally, single-stage amplifiers have lower part count and lower power requirements, and are less expensive compared to multi-stage amplifiers. Additionally, the cost, space, and failure rate associated with a signal processing device is avoided.

It is noteworthy that the "split ladder" configuration illustrated in FIG. 3A allows one to add additional amplifiers after the last rung of the ladder without disrupting existing signal traffic, thus allowing expansion of the signal traffic carried on the network. In a split ladder configuration the last rung on the red and blue ladder can be at the longest and shortest wavelengths of the input signal spectrum, or can include intermediate segments of the spectrum, according to the wavelength selective filters implemented in the preceding rungs of the amplifier array. Thus, as the occupancy of the potential input signal spectrum is increased, additional amplification capacity can be added without disrupting signal traffic.

In FIG. 3A, the wavelength selective filters, e.g. the first input filter 104 and first output filter 130, are illustrated as being integrated with the amplifiers, e.g. the first amplifier 106. However, in alternative embodiments the amplifier and associated filters could be provided as separate components. Such an arrangement would allow repair or replacement of the amplifier while leaving the input and output filters in place. Thus that rung could be modified without affecting signal traffic on the other rungs. For example, changes to network may allow an originally wide channel to be split into many narrower channels, and it may be desirable to provide amplification and an ADD/DROP function for each of the narrower channels, for example. Alternatively, improvements in amplifier performance may make it desirable to upgrade an amplifier or amplifier stage, with a more efficient or lower noise amplifier, for example.

Figure 3B:
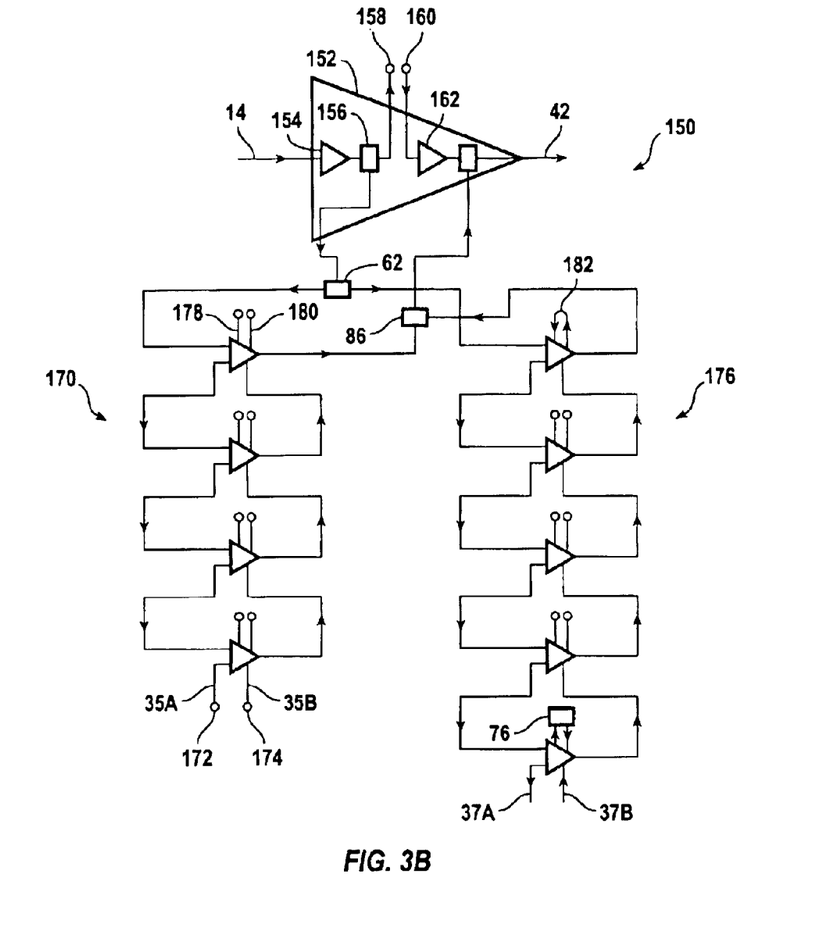
FIG. 3B is a simplified diagram of a split cascade amplifier with a common preamplifier according to yet another embodiment of the present invention.

FIG. 3B is a simplified schematic of a split ladder amplifier array 150 according to another embodiment of the present invention. A first amplifier 152 receives an input signal from the input transmission line 14. The first amplifier includes a broadband preamplifier 154 that amplifies the input signal before the first input filter 156 divides the input signal into a selected segment that is transmitted to the center tap output 158 and a remainder of the signal, which is reflected to a red/blue splitter 62. As described above in relation to FIG. 3A, the segment of the input signal routed through the first amplifier stage is chosen according to the transmission-reflection characteristics of the red/blue splitter 62 and/or combiner 86. The center tap output 158 and associated center tap input 160 allows the preamplified segment of the input signal to be processed, such as for dispersion compensation and/or level adjustment, or can provide an ADD/DROP function, for example. A second stage 162 of the first amplifier 152 can be optimized for the selected segment of the input signal. For example, the second stage could be a narrow-band, high-gain, high-power amplifier, in contrast to the preamplifier 154, which might be a broad-band, low-noise amplifier.

Amplifiers in the respective cascades 170, 176 can also have center tap ports, for example ports 178 and 180. The common preamplifier 154 generally provides sufficient improvement in the input signal quality to connect a signal processing module to these ports, which are preferably located between the input filter and amplifier of a given amplifier path (rung). The amplifier array allows a signal processing module 76 to be connected to some center taps, while a shunt transmission line 182 may connect the center tap ports of other paths. In other words, it is recognized that some amplifier paths might not need signal processing in a given amplifier array. It is further recognized that a channel that is routed through a signal processing module at one array might not need signal processing at a preceding or following array, i.e. a channel might "skip" signal processing in some amplifier stages of a transmission repeater network. Furthermore, some channels might be of sufficient quality or have specifications allowing the signal to be amplified without adding a signal processing function. Omitting the signal processing function from an amplifier path generally simplifies the components required, and reduces cost, cabinet space, power requirements, and failure rate.

The red/blue splitter 62 further divides the input signal into two more segments, as described above in conjunction with FIG. 3A. However, because the entire input signal has been amplified by the preamplifier 154, amplifiers in the rungs of the red and blue ladders can be single-stage amplifiers or otherwise simplified. This advantage can save amplifier cost, space within a repeater cabinet or other facility, reduce power consumption by reducing the amplifier pump power required, and improve reliability by reducing the component count, particularly the number of amplifiers and associated pump circuits.

For purposes of illustration, the red ladder 170 is shown with a pair of bypass ports 172, 174 cascading off the last rung, as is the blue ladder 176. As described above in conjunction with FIGS. 1A and 3A, the ladder configuration allows upgrading of the amplifier array by adding additional rungs to accommodate additional segments of the input spectrum as those segments are occupied with signals, without disrupting existing signal traffic. For example, suppose the amplifier array shown in FIG. 3B routes each of the occupied channels (and potentially unoccupied channels) on the input signal through one of the existing amplifiers, but it is desired to add additional channels on the input transmission line 14. Additional rungs may be added onto either ladder without disrupting the signal traffic being carried by the system. It is specifically understood that the additional channels do not need to be added at one end of the band or the other, and that segments of the input signal spectrum might not be occupied, as discussed above in reference to FIG. 1A, even if that portion of the spectrum containing the segment would be passed by an existing input and output filter pair.

Figure 4:
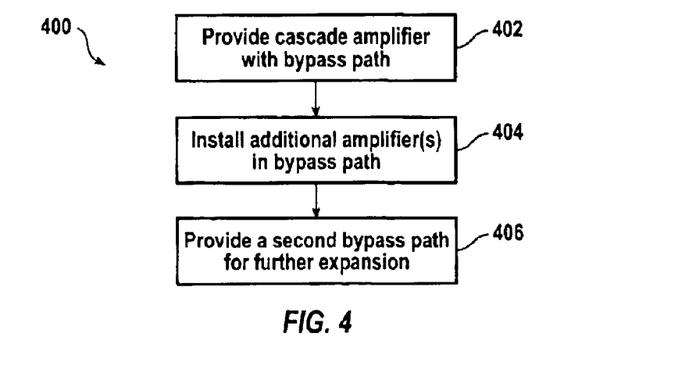
FIG. 4 is a simplified flow chart of a method for expanding an amplifier array according to an embodiment of the present invention.

FIG. 4 is a simplified flow chart of a process 400 for expanding an optical amplifier array, according to an embodiment of the present invention. A cascade amplifier array is provided with a first bypass path (step 402). As discussed above in reference to FIGS. 1A and 1B, the bypass path could be left open as a pair of bypass ports, or could be connected with a transmission line. A further amplifier path is installed in the first bypass path (step 404). In a further step, a second bypass path is provided (step 406) for future expansion. In a particular embodiment, an amplifier module that includes a set of bypass ports is installed, essentially combining steps 404 and 406.

Table 1 illustrates a further advantage of the split ladder or split cascade amplifier array configuration shown in FIGS. 3A and 3B. Each wavelength selective filter, whether input or output, has an associated transmission loss and reflection loss. If the amplifiers (and signal processing modules, if any) were replaced with thru lines, the combination of losses through the array between the input fiber and the output fiber is known as the insertion loss ("IL") of the array. The optical signal typically needs to be kept at or above a minimum amplitude, and losses, whether from the array, transmission fibers, or other sources, can accumulate until some amplification is needed. It is generally desirable to minimize the amount of gain needed to maintain a signal at the desired level because higher gain typically requires higher pumping power and often injects more noise. Thus, even though an amplifier may be capable of providing sufficient gain to overcome the insertion loss of the signal path, it is generally desirable to minimize insertion loss and thus reduce gain requirements.

Figure 5:
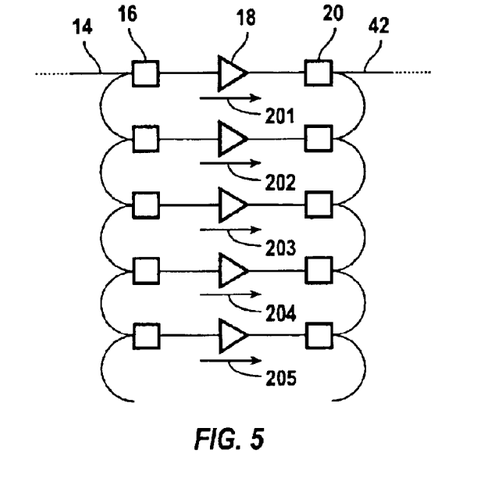
FIG. 5 is a simplified diagram of a cascade amplifier array with five parallel amplifier paths and a set of bypass ports.

For purposes of illustration and simplicity, a reflection loss of 0.35 dB and a transmission loss of 0.55 dB will be assumed for all channels and filters, including the splitter and combiner. Table 1 shows that a straight cascade, such as shown in FIG. 5, accumulates 3.9 dB of insertion loss through the fifth amplifier path 205, and a difference in the insertion loss between the first 201 and fifth paths of 2.8 dB. In comparison, referring to FIG. 3A, a split cascade accumulates only 3.4 dB of insertion loss for the fifth amplifier path.

TABLE 1

| Cascade Array | IL (dB) | ΔIL (dB) | Split Cascade | IL (dB) | ΔIL (dB) |
| --- | --- | --- | --- | --- | --- |
| Path 1 (201) | 1.10 | 0 | Path 3 (303) | 1.10 | 0 |
| Path 2 (202) | 1.80 | 0.7 | Path 1, 4 (301, 304) | 2.70 | 1.6 |
| Path 3 (203) | 2.50 | 1.4 | Path 2, 5 (302, 305) | 3.40 | 2.3 |
| Path 4 (204) | 3.20 | 2.1 | | | |
| Path 5 (205) | 3.90 | 2.8 | | | |

Referring to FIG. 5 as an example of a cascade array, path 1 201 accumulates 1.10 dB of insertion loss (between the input transmission line and the output transmission line) being transmitted through the first input filter and first output filter. Path 2 202 accumulates 1.10 dB of insertion loss being transmitted through the second input filter and the second output filter, as well as 0.35 dB of loss being reflected off of the first input filter, and another 0.35 dB of loss being reflected off of the first output filter. Each subsequent rung accumulates an additional 0.7 dB of loss, compared to the first rung.

Referring to FIG. 3A as an example of a split cascade array, the segment of the input signal that is passed through the first amplifier (path 3 303) accumulates 1.10 dB of insertion, as in the cascade array. However, advantages in both the total insertion loss and the difference between the maximum and minimum insertion loss are obtained in the split cascade. For purposes of illustration, it is assumed that the red/blue splitter and the red/blue combiner are configured with respect to the red and blue signal paths so that each path includes the same insertion losses through both the splitter and combiner, i.e. 0.35 dB +0.55 dB=0.9 dB. Thus, the first rung of each sub-array (paths 1 301 and 4 304) accumulates 0.35+0.9+1.10+0.35 dB=2.7 dB of insertion loss, slightly more than a three-rung cascade. However, the second rung (paths 2 302 and 5 305) accumulates only 3.40 dB of insertion loss, compared to 3.9 dB of accumulated insertion loss for a five-rung cascade. Split cascade amplifier arrays with additional (more than 5) amplifier paths offer further savings in insertion loss compared to straight cascade arrays. Additionally, the difference between the minimum insertion loss (path 1 in the straight cascade and path 3 in the split cascade) versus the maximum insertion loss is reduced in the split cascade array. In some embodiments, amplifier paths are designed to carry four adjacent channels.

Figure 6:
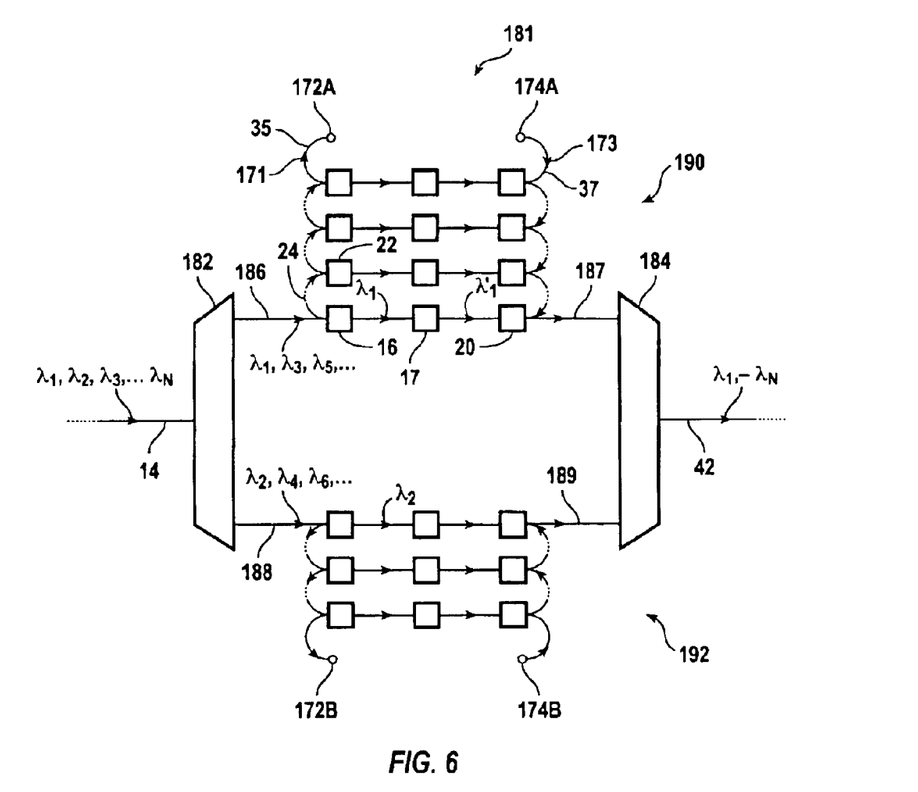
FIG. 6 is a simplified diagram of an interleaved amplifier array according to another embodiment of the present invention.

FIG. 6 is an optical component array 181 according to another embodiment of the present invention using an interleaf demultiplexer 182 and interleaf multiplexer 184. Interleaf multiplexers and demultiplexers are available from a variety of vendors, such as AVANEX of Fremont, Calif. and JDS UNIPHASE CORPORATION, of San Jose, Calif. A plurality of channels $\lambda 1, \lambda 2, \lambda 3, \ldots, \lambda N$ is provided to the interleaf demultiplexer on an input transmission line 14. The interleaf demultiplexer directs a first set of channels $\lambda 1, \lambda 3, \lambda 5, \ldots$ (referred to for purposes of illustration as the "odd" channels) to a first demultiplexer output path 186 and directs a second set of channels λ2, λ4, λ6, . . . (referred to for purposes of illustration as the "even" channels) to a second demultiplexer output path 188.

The odd and even channels are interleaved, i.e. an odd channel is between two even channels in the optical spectrum. Thus the channel spacing between each of the even channels at the second demultiplexer output is essentially twice the nominal channel spacing between odd and even channels (assuming evenly spaced channels for purposes of illustration). The wider separation between channels reduces inter-channel interference, such as cross-talk or noise, when using a wavelength selective input optimized for pass-band characteristics, for example. Alternatively, a wavelength selective filter designed for one channel spacing, e.g. 100 GHz, might achieve similar performance in an interleaved system when used with a channel spacing of only 50 GHz.

A desirable feature of preferred interleaf multiplexers is that, unlike a filter matrix of certain types of conventional multiplexers, the precise number of channels to be multiplexed does not need to be anticipated, as long as the channels fall within the operating band of the interleaf multiplexer. Operation of these interleaf multiplexers works on a frequency interference type effect, producing "combs" of odd and even channels when the proper optical signals are present.

The first demultiplexer output path 186 routes the odd channels to a first optical component sub-array 190 that includes a first wavelength selective input filter 16 passing a first portion λ1 of the odd channels to a first optical component 17 and then a modified first portion λ1' through a first wavelength selective output filter 20 to the interleaf multiplexer 184 via a first interleaf multiplexer input 187. The odd channels not passed through the first wavelength selective output filter are optically coupled to a second wavelength selective input filter 22 through an input cascade transmission line 24 and so forth, as described above in conjunction with FIG. 1. A bypass output line 35 provides a bypass output port 172A for the remaining portion 171 of the input signal spectrum and a bypass input line 37 is configured to carry optical signals 173 provided at a bypass input port 174A for future expansion of the optical component sub-array. It is understood that the second optical component sub-array 192 operates in a similar fashion, having a second interleaf demultiplexer path 188 and a second interleaf multiplexer input path 189.

The combination of the interleaf demultiplexer, interleaf multiplexer, and bypass ports of the respective optical component sub-arrays allows for expansion of odd and/or even channels without disrupting existing signal traffic, assuming the channels are within the operating spectrum of the interleaf components. The separation of the channels by the interleaf components works in conjunction with the wavelength selective input and output filters to provide optical paths through rungs of the sub-arrays with acceptable pass-band transmittance and out-of-band rejection, even if the filter characteristics of the wavelength selective filters would be unacceptable in a non-interleaved system.

While the description above provides a full and complete disclosure of the preferred embodiments of the present invention, various modifications, alternatives, and equivalents will be obvious to those of skill in the art. For example, while embodiments of the invention have been described primarily with reference to dielectric stack WDM filters, other types of filters, such as fiber Bragg grating filters, may be used with appropriate isolators, couplers or other devices, such as a wavelength selective coupler. Similarly, a variety of optical amplifiers may be employed. Accordingly, the scope of the invention is limited solely by the following claims.

What is claimed is:

1. An optical component array comprising:
   an input transmission line capable of carrying an optical input signal including a plurality of channels;
   a first wavelength selective input filter optically coupled to the input transmission line, the first wavelength selective input filter configured to optically couple a first segment of the optical input signal to a first optical component, and to optically couple a first remaining portion of the optical input signal to
   a second wavelength selective input filter, the second wavelength selective input filter configured to optically couple a second segment within the first remaining portion of the optical input signal to a second optical component and to optically couple a second remaining portion of the optical input signal to a bypass output port;
   a bypass input port optically coupled to a first wavelength selective output filter, the first wavelength selective output filter being configured to optically couple at least an optical signal from the bypass input port to a second wavelength selective output filter, the second wavelength selective output filter being configured to optically couple at least a modified first segment from the first optical component and the optical signal from the bypass input port to an output transmission line.

2. The optical component array of claim 1 wherein the bypass input port is optically coupled to the bypass output port with an optical transmission line.

3. The optical component array of claim 2 wherein a bypass optical amplifier is disposed in an optical path coupling the bypass input port to the bypass output port.

4. The optical component array of claim 1 wherein the first optical component is a first optical amplifier and the second optical component is a second optical amplifier, and at least one of the first optical amplifier and the second optical amplifier includes a center tap output port and a center tap input port.

5. The optical component array of claim 4 further comprising a signal processing module disposed between, and optically coupled to, the center tap input port and the center tap output port.

6. The optical component array of claim 4 further comprising a shunt transmission line disposed between and optically coupled to the center tap input port and the center tap output port.

7. The optical component array of claim 4 wherein the first optical component is selected from the group consisting of an optical amplifier, a multiplexer, a de-multiplexer, a filter, a dispersion compensation module, a cross connection, an ADD/DROP module, an amplitude adjustment module, and a thru line.

8. The optical component array of claim 1 wherein the bypass output port is an open bypass output port and the bypass input port is an open bypass input port.

9. An expandable optical component array comprising:
   an optical input transmission line configured to optically couple a plurality of optical channels to
   an interleaf demultiplexer, the interleaf demultiplexer providing a first subset of the plurality of optical channels to a first interleaf demultiplexer output, the first interleaf demultiplexer output being optically coupled to a first optical component sub-array at a first wavelength selective input filter, the first wavelength selective input filter optically coupling a first portion ($\lambda 1$) of the first subset of the plurality of optical channels to a first optical component, the first optical component being optically coupled to a first wavelength selective output filter, the first wavelength selective input filter optically coupling a second portion of the first subset of the plurality of optical channels to a bypass output port, and the first wavelength selective output filter being configured to optically couple an optical signal from a bypass input port and optically coupling a modified first portion of the first subset of the plurality of optical channels to a first interleaf multiplexer input, the first interleaf multiplexer input being optically coupled to an optical output transmission line.

10. The expandable optical component array of claim 9 further comprising:

a second interleaf demultiplexer output optically coupled to at least a second bypass output port and the interleaf demultiplexer; and a second interleaf multiplexer input optically coupled to at least a second bypass input port and an interleaf multiplexer.

11. The expandable optical component array of claim 9 wherein the first optical component includes center tap ports.

* * * * *